United States Patent [19]

Sakamoto et al.

[11] Patent Number: 4,458,192
[45] Date of Patent: Jul. 3, 1984

[54] A.C. MOTOR DRIVE APPARATUS

[75] Inventors: Keiji Sakamoto, Hachioji; Shinji Seki, Tokyo, both of Japan

[73] Assignee: Fanuc Ltd., Tokyo, Japan

[21] Appl. No.: 474,335

[22] Filed: Mar. 11, 1983

[51] Int. Cl.$^3$ .............................................. H05P 5/40
[52] U.S. Cl. .................................... 318/798; 318/803; 318/806; 318/811
[58] Field of Search ................ 318/798, 806, 803, 811

[56] References Cited

U.S. PATENT DOCUMENTS

| | | | |
|---|---|---|---|
| 3,851,234 | 11/1974 | Hoffman et al. | 318/800 |
| 4,320,331 | 3/1982 | Plunkett | 318/722 |
| 4,322,671 | 3/1982 | Kawada et al. | 318/811 |
| 4,361,794 | 11/1982 | Kawada et al. | 318/811 |

Primary Examiner—David Smith, Jr.
Attorney, Agent, or Firm—Staas & Halsey

[57] ABSTRACT

An apparatus for driving an A.C. motor includes a circuit for computing the sum of polyphase A.C. signals used to drive a pulse-width modulation circuit for controlling an inverter, and for limiting the amplitude of a current command when said sum is other than zero. When an imbalance occurs in the polyphase A.C. signals, the current command amplitude is immediately limited in accordance with the state of the imbalance to prevent saturation of a current amplifier that is operable to produce the polyphase A.C. signals by amplifying the outputs of an arithmetic circuit. These outputs are difference currents obtained by computing the difference between polyphase command currents and corresponding ones of detected polyphase currents actually applied to the A.C. motor. Preventing saturation of the current amplifier assures that the polyphase currents actually applied to the A.C. motor will be held in a balanced state at all times.

2 Claims, 9 Drawing Figures

A.C. MOTOR DRIVE APPARATUS

BACKGROUND OF THE INVENTION

This invention relates to an A.C. motor drive apparatus for raising the torque of an A.C. motor such as an induction motor or synchronous motor.

It is well known in the art that variable frequency (VF) control and variable voltage-variable frequency (VVVF) control are available as control methods in a control apparatus for converting direct current into alternating current by means of an inverter circuit to drive an induction motor through use of the alternating current. With a control apparatus relying upon the VF control method, a primary frequency, which is the output of the inverter circuit, is varied in accordance with a speed command. With a control apparatus that operates based on the VVVF control method, the amplitude of the primary voltage also is varied in proportion to the change in primary frequency, with the output torque being held constant. These control apparatuses deal with the voltage and current applied to the induction motor in terms of amplitude and frequency, but both of them effect control based on mean values. It is not possible, therefore, to achieve fine control with good response. Accordingly, in order to improve upon this disadvantage, a so-called "vector control apparatus" has recently been developed and put into practical use. With the vector control apparatus, a pulse-width control method is employed to control the momentary value of the stator current of an induction motor, enabling torque generation similar to that seen in a shunt-wound D.C. machine. The vector control method applied to induction motors is based on the torque generating principle of a shunt-wound D.C. machine and controls the momentary value of a stator current to generate a torque in the same manner as said D.C. machine.

The torque generating mechanism of a shunt-wound D.C. machine is such that a current switching operation is effected by a commutator in order that the magnetomotive force of an armature current $I_a$ will lie perpendicular to the main magnetic flux $\phi$ at all times. The generated torque Ta is expressed by the following equation, the torque $T_a$ being proportional to the armature current $I_a$ if the main magnetic flux $\phi$ is constant:

$$T_a = k \cdot I_a \cdot \phi \tag{1}$$

In order to apply the foregoing relation to an induction motor, correspondence is established between $\phi$ and the magnetic flux vector $\phi_2$ of a rotor, and between $I_a$ and a secondary current vector $I_2$. Accordingly, to drive an induction motor in accordance with a principle resembling the generation of a torque by means of a shunt-wound D.C. machine, control should be effected in such a manner that the relation between the rotor flux vector $\phi_2$ and the secondary current $I_2$ is a perpendicularly intersecting one. The generated torque $T_a$, neglecting secondary leakage reactance, is expressed by:

$$T_a = k \, I_2 \phi_2 \div k \, I_2 \phi_m \tag{2}$$

(where $\phi_m$ is the main magnetic flux arising from an excitation current $I_o$).

Let us consider the stator current applied to the stator windings in the case of, say, a two-phase induction motor. Let the A-B axes represent the static coordinate system of the stator, $I_1$ the stator current (primary current), $I_o$ an excitation current component, and $I_2$ a secondary current. Also, let $I_{1a}$, $I_{1b}$ denote the A- and B-axis components of the stator current $I_1$, namely the A-phase stator current and B-phase stator current, respectively. If we assume that the main flux $\phi_m$ is rotating with respect to the static coordinate system of the stator at an angle of rotation $\phi$ ($\phi = \omega t$ if the angular velocity is $\omega$), then the A-phase stator current $I_{1a}$ and B-phase stator current $I_{1b}$ will be expressed by the respective equations:

$$I_{1a} = I_o \cos \phi - I_2 \sin \phi \tag{3}$$

$$I_{1b} = I_o \sin \phi + I_2 \cos \phi \tag{4}$$

Thus, in accordance with the control apparatus that operates based on the vector control method, the A-phase and B-phase stator currents $I_{1a}$, $I_{1b}$ indicated by Eqs. (3), (4) are generated and applied to the stator windings (primary windings) to drive the induction motor. When the load changes, only the secondary current $I_2$ is increased or decreased accordingly, with the excitation current $I_o$ being held constant.

Driving the aforementioned A.C. motor is accomplished by obtaining, from a current command circuit, a current command amplitude based on an arithmetic difference between a speed command signal and an actual speed signal from a speed feedback loop that indicates the actual speed of the A.C. motor, generating a current command in each phase based on the current command amplitude, this being achieved by means of a phase command generating circuit, obtaining from a difference output circuit a difference current between each phase of the current command and respective phase currents actually applied to the A.C. motor, these phase currents being obtained from a current feedback loop, amplifying each difference current by an amplifying circuit and driving the A.C. motor by the output of the amplifying circuit. The current command in each phase is generated with the amplitude of the sinusoidal signal corresponding to each phase serving as a current command amplitude. The current command in each phase is obtained by multiplying the corresponding sinusoidal signal by the amplitude of the current command. The current command in each phase produced in this manner is delivered through a current amplifier. Since the current amplifier has a saturation characteristic, the amplifier will saturate when the amplitude of the corresponding sinusoidal signal is large, giving rise to distortion of the sinusoidal signal waveshape. The current command in each phase will therefore include a wave component other than the fundamental harmonic (wave) component, which is sinusoidal. In other words, the current command in each phase will come to include a higher harmonic component. Because the higher harmonic component is generated independently of the fundamental harmonic, it plays no part in the A.C. motor torque, and an increase in the higher harmonic component will result in a drop in the voltage applied to the motor. Accordingly, for a constant A.C. input voltage, the torque-rotational speed characteristic of the A.C. motor will take on the appearance shown in b of FIG. 1. In FIG. 1, b indicates the characteristic that results with inclusion of the higher harmonic component arising from saturation of the current amplifier, whereas a shows a characteristic in which only the fundamental harmonic is included. A defect in the prior art, therefore, is that the decline in voltage applied to the A.C. motor causes gives rise to a lower torque, as depicted by characteristic b, resulting in poorer stability with respect to an external load.

SUMMARY OF THE INVENTION

An object of the present invention is to provide an A.C. motor drive apparatus adapted to prevent an imbalance from occurring in multiple phase currents applied to an A.C. motor.

Another object of the present invention is to provide an A.C motor drive apparatus adapted to prevent saturation of a current amplifier included in the current command circuitry of an A.C. motor.

Still another object of the present invention is to provide an A.C. motor drive apparatus adapted to limit current command amplitude so as to prevent saturation of a current amplifier included in the current command circuitry of an A.C. motor, thereby preventing a decline in torque to provide excellent stability with respect to an external load.

According to the present invention, these and other objects are attained by providing an A.C. motor drive apparatus which includes a circuit for producing a current command amplitude from an arithmetic difference between an externally applied speed command voltage and an actual speed voltage indicative of the actual rotational speed of the A.C. motor, a circuit for generating polyphase command currents based on the current comand amplitude, a current detecting circuit for detecting polyphase currents actually applied to the A.C. motor, an arithmetic circuit for producing output signals indicative of difference currents between the polyphase command currents and corresponding ones of the phase currents detected by the current detecting circuit, a current amplifier which amplifies the outputs of the arithmetic circuit for producing polyphase A.C. signals, a pulse-width modulation circuit driven by the polyphase A.C. signals from the current amplifier, an inverter controlled by the pulse-width modulation circuit for driving the A.C. motor, and means for computing the sum of the polyphase A.C. signals and for limiting the current command amplitude when said sum is other than zero. The current command amplitude is limited in accordance with any imbalance in the polyphase A.C. signals to maintain the polyphase currents actually applied to the A.C. motor in a balanced state.

By virtue of the above-mentioned arrangement, current command amplitude is limited to prevent saturation of the current amplifier, so that the current command obtained in each phase is approximately sinusoidal in shape, being devoid of a higher harmonic component. Thus there is no decrease in the effective voltage impressed upon the A.C. motor, and no decline in torque.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
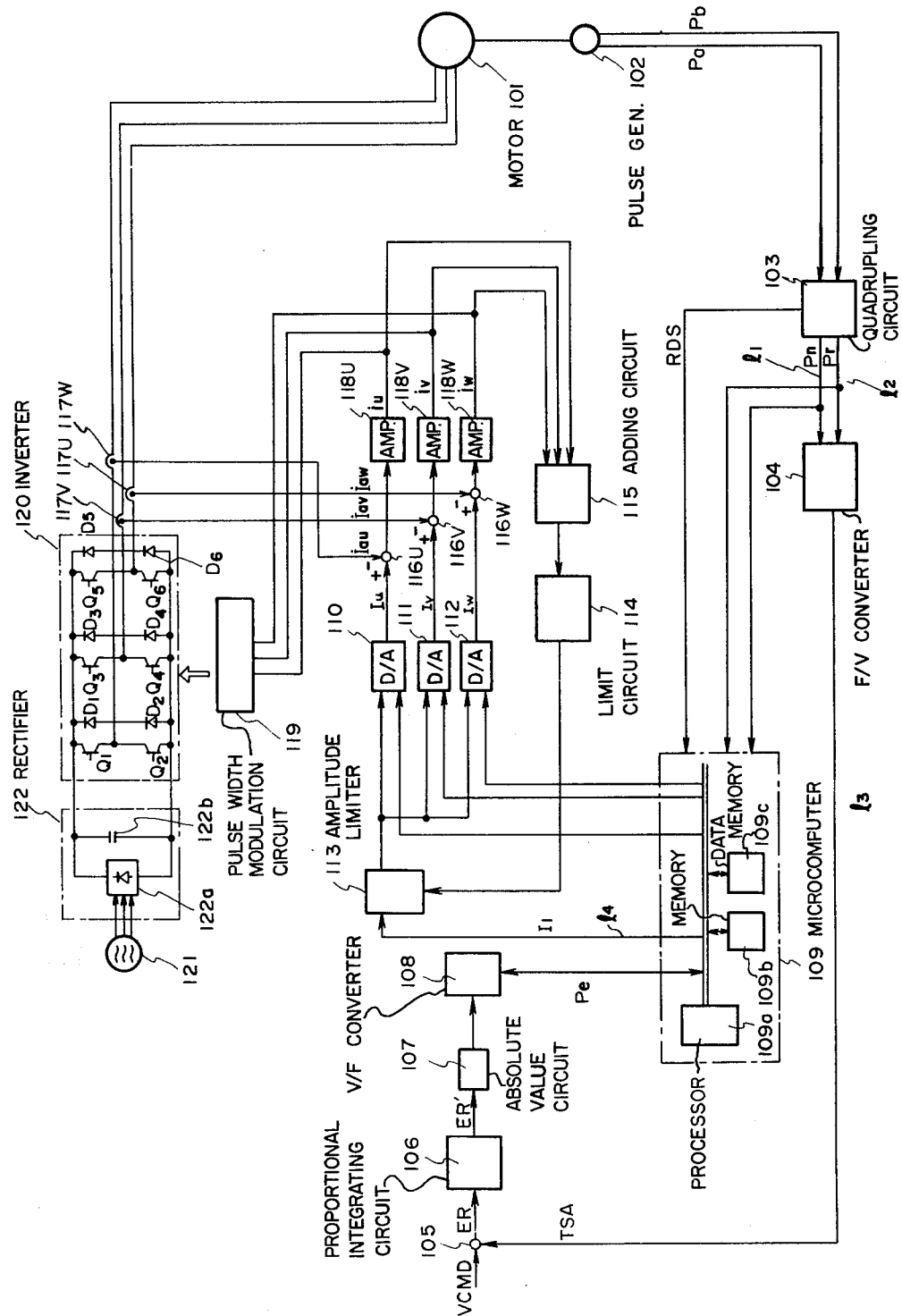
FIG. 2 is a block diagram illustrating an embodyment of an induction motor drive apparatus according to the present invention.

Reference will first be had to FIG. 2 illustrating an inductionmotor drive apparatus embodying the present invention. In the Figure, numeral 101 denotes a three-phase induction motor, and 102 a pulse generator, such as a resolver, for generating two sinusoidal signals $P_a$, $P_b$ which are displaced in phase from each other 90° and proportional to the rotational speed of the motor. A quadrupling circuit 103 receives the two-phase sinusoidal signals $P_a$, $P_b$ and is adapted to convert them into pulse trains having four times the frequency of the input sinusoidal signals. The quadrupling circuit 103 monitors the sinusoidal signals $P_a$, $P_b$, produces a rotational direction signal RDS, and delivers a forward pulse train $P_n$ of the quadrupled frequency on line $l_1$ when the motor is rotating in the forward direction, and a reverse pulse train $P_r$ on line $l_2$ when the motor is rotating in the reverse direction. The forward and reverse pulse trains $P_n$, $P_r$ are applied to a frequency-voltage converter (referred to hereinafter as an F/V converter) 104 adapted to convert the pulse frequency into a voltage signal TSA indicative of the actual speed of the induction motor. An arithmetic circuit 105 receives the actual speed voltage signal TSA as well as a speed command voltage VCMD from a speed command circuit, not shown, and is adapted to generate the difference (known as the speed error) ER between TSA and VCMD. A proportional integrating circuit 106 proportionally integrates the error signal ER from the arithmetic circuit 105. An absolute value circuit 107 takes the absolute value of the speed error ER and applies it to a voltage-frequency (V/F) converter 108 which responds by producing a pulse train $P_e$ whose frequency is proportional to the magnitude of ER. The pulse train $P_e$ enters a microcomputer 109 having a processor 109a, a control program memory 109b and a data memory 109c. The data memory 109c stores such digital data as the torque vs. amplitude characteristic (T—$I_1$ characteristic) and the rotation angle vs. sine value characteristics (sine pattern), in the form of a function table. The processor 109a counts the pulses $P_e$ from the V/F converter 108 for a predetermined period of time under the direction of the control program and utilizes the counted value N as well as the T—$I_1$ characteristics to produce a digital signal indicative of the current amplitude $I_1$. In other words, the processor takes the counted value N as the torque command and finds $I_1$ from the T—$I_1$ characteristic, with $I_1$ being delivered as the current command. The processor 109a produces the following outputs in the form of digital signals:

$$\sin(w_n + w_s + \psi) \quad (5)$$

$$\sin(w_n + w_s + \psi + 2\pi/3) \quad (6)$$

$$\sin(w_n + w_s + \psi + 4\pi/3) \quad (7)$$

using pulse train $P_n$ or $P_r$ which has an angular frequency $w_n$ proportional to the rotation speed of the induction motor 101, as well as a constant phase difference $\psi$, etc. Note that $w_s$ represents the slip angular frequency, and $\psi$ the phase difference.

Numerals 110, 111, 112 are DA converters having multiplying function which performs the operation respectively:

$$I_1 \cdot \sin(w_n + w_s + \psi) \quad (8)$$

$$I_1 \cdot \sin(w_n + w_s + \psi + 2\pi/3) \quad (9)$$

$$I_1 \cdot \sin(w_n + w_s + \psi + 4\pi/3) \quad (10)$$

and converts these values into analog quantities, and delivers the corresponding analog current commands $I_u$, $I_v$, $I_w$ for the U-, V- and W-phases. Numeral 113 denotes an amplitude limiting circuit, 114 a limit value generating circuit and 115 and analog circuit. The circuits 113 through 115 will be described in detail later. Indicated at 116U, 116V, 116W are arithmetic circuits in the respective phases for computing the current differences between the commands currents $I_U$, $I_V$, $I_W$ and actual phase currents Iau, Iav, Iaw, respectively. Numerals 117U, 117V, 117W designate current transformers for sensing the actual phase currents Iau, Iav, Iaw in the respective U, V and W phases, and 118U, 118V, 118W current amplifiers in the respective phases for amplifying the current differences input thereto from the arithmetic circuits 116U, 116V, 116W to produce alternating current signals iu, iv, iw in the respective phases U, V, W. The outputs of the current amplifiers 118U, 118V, 118W are applied to a pulse-width modulation circuit 119 connected to an inverter 120 controlled by the output of the pulse-width modulation circuit. A three-phase A.C. power supply 121 supplies power to a well-known rectifier circuit 122 comprising a group of diodes 122a and a capacitor 122b for converting the three-phase alternating current into direct current.

Figure 3:
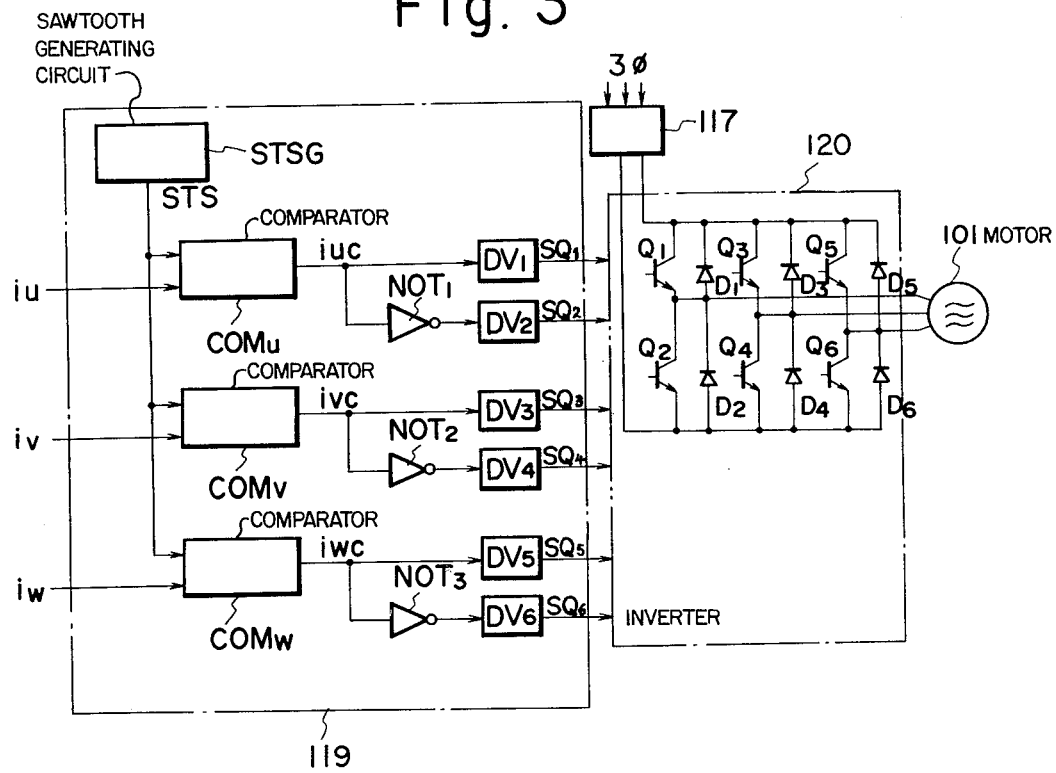
FIG. 3 is a circuit diagram of a pulse-width modulation circuit included in the apparatus of FIG. 2.
Figure 4:
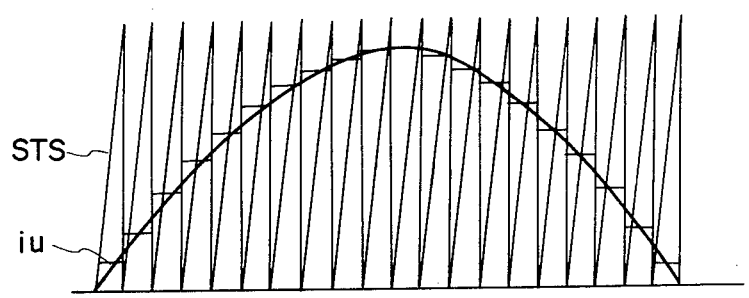
FIG. 4 shows a diagram useful in describing operation of the circuit shown in FIG. 3.
Figure 4:

As illustrated in FIG. 3, the pulse width modulation circuit 119 comprises a sawtooth generating circuit for generating a sawtooth waveform STS, comparators COMU, COMV, COMW, NOT gates $NOT_1$ through $NOT_3$, and drivers $DV_1$ through $DV_6$. The inverter 120 includes six power transistors Q1 through Q6 and six diodes D1 through D6. The comparators COMU, COMV, COMW of the pulse width modulation circuit 119 compare the sawtooth signal STS with the amplitudes of the three-phase alternating current signals $i_u$, $i_v$, $i_w$, respectively, and produce a "1" output when the magnitude of STS is exceeded by $i_u$, $i_v$ or $i_w$, or a "0" output when the magnitude of STS is greater. Thus, with respect to $i_u$, the comparator COMU produces the current command $i_{uc}$ shown in FIG. 4. More specifically, pulse-width modulated three-phase current commands $i_{uc}$, $i_{vc}$, $i_{wc}$ dependent upon the amplitudes of $i_u$, $i_v$, $i_w$ are delivered as inverter drive signals SQ1 through SQ6 via NOT gates $NOT_1$ through $NOT_3$ and drivers $DV_1$ through $DV_6$, and are applied as input signals to the inverter 120. The inverter drive signals SQ1 through SQ6 input to the inverter 120 are applied to the bases of the power transistors Q1 through Q6, respectively, thereby controlling the on/off action of the power transistors to supply the induction motor 101 with a three-phase current.

Figure 6:
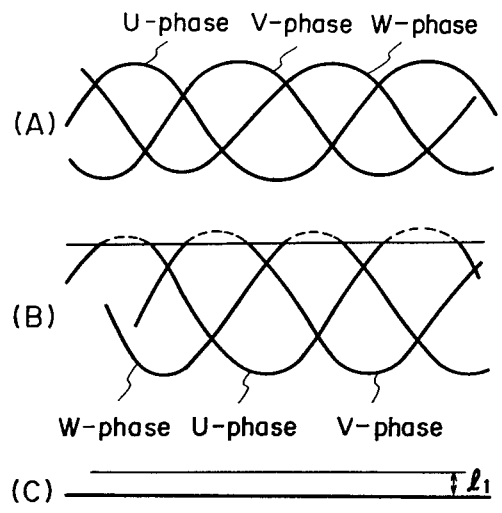
FIG. 6 is a waveform diagram useful in describing the operation of the circuitry shown in FIG. 5.
Figure 1:
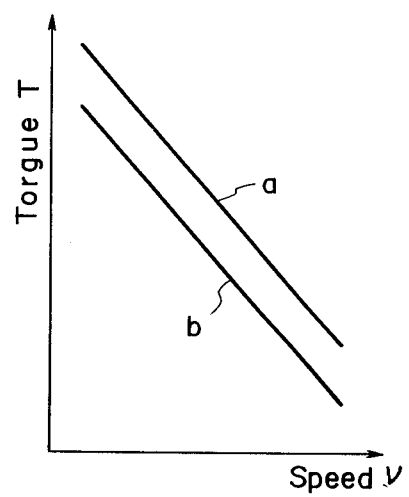
FIG. 1 shows torque-speed characteristics useful in describing the problem to which the present invention provides a solution.
Figure 5:
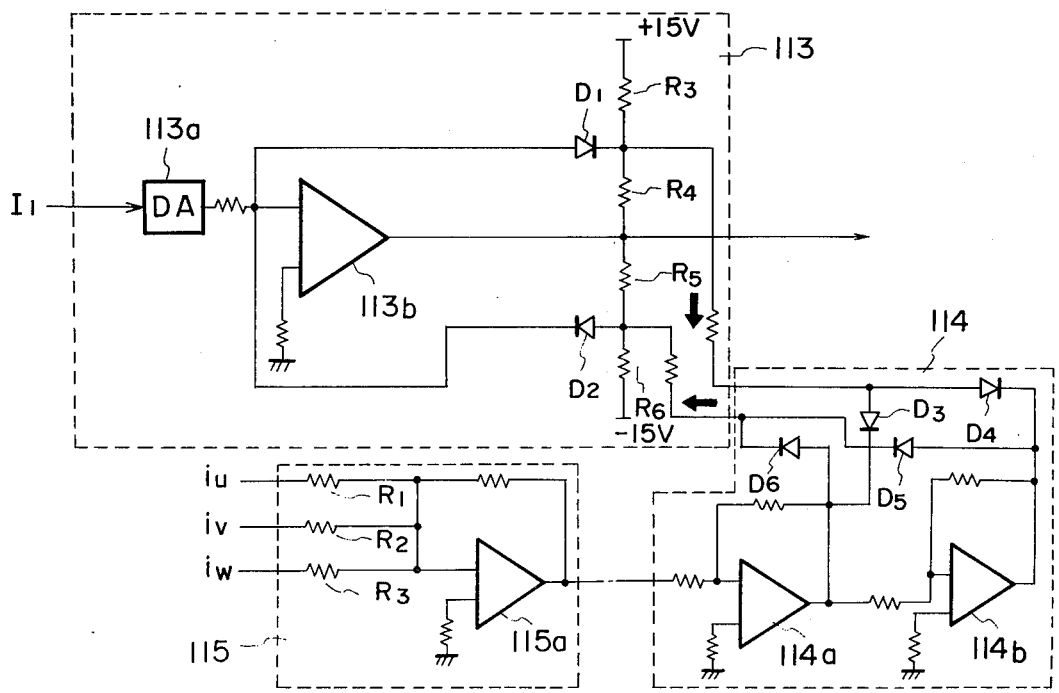
FIG. 5 is a circuit diagram illustrating an error amplifier, amplitude limiting circuit, limit value generating circuit and adding circuit included in the apparatus of FIG. 2.

The details of the amplitude limiting circuit 103, limit value generating circuit 114 and adding circuit 115 are shown in FIG. 5. The adding circuit 115 is an analog adder comprising three input resistors R1, R2, R3 and an adding amplifier 115a. The adding circuit 115 receives the three-phase alternating current signal outputs $i_u$, $i_w$, $i_v$ from the respective current amplifiers 118U, 118V, 118W through its resistors R1, R2, R3, these signals being added by the adding amplifier 115a to produce the output of the circuit, namely a signal indicative of $i_u + i_v + i_w$. The output of the adding amplifier 115a will have a magnitude of zero when each of the signal outputs $i_u$, $i_v$, $i_w$ of the error amplifiers 118U, 118V, 118W comprises solely the fundamental harmonic, namely a sine wave, as illustrated in (A) of FIG. 6. If the sine waves are distorted into the trapezoidal waveforms shown in (B) of FIG. 6 owing to saturation, then the output of the adding amplifier 115a will be non-zero, namely a voltage $e_1$, shown in (C) of FIG. 6, corresponding to the distortion. The output voltage will take on either a positive or negative value, depending upon the direction of motor rotation.

The limit value generating circuit 114 comprises a pair of series-connected current amplifiers 114a, 114b, a pair of resistors D3, D6 connected forwardly and backwardly to the output terminal of current amplifier 114a, and a pair of resistors D4, D5 connected forwardly and backwardly to the output terminal of current amplifier 114b. When the output of the adding amplifier 115a is a positive voltage (A.C. motor 101 rotating in forward direction), the output of the current amplifier 114a is a negative voltage and that of the error amplifier 114b a positive voltage, whereby a current flows into the amplitude limiting circuit 113 from the current amplifier 114b through the diode D5 and then from the amplitude limiting circuit 113 into the current amplifier 114a through diode D3. When the output of the adding amplifier 114a is a negative voltage (motor rotating in reverse direction), on the other hand, the output of the current amplifier 114a is a positive voltage and that of the current amplifier 114b a negative voltage, whereby a current flows into the amplitude limiting circuit 113 from the current amplifier 114a through the diode D6, and then from the amplitude limiting circuit 113 into the current amplifier 114b through the diode D4. The amplitude limiting circuit 113 has a DA converter 113a for converting the current amplitude $I_1$ (digital value) to the analog value, an error amplifier 113b, two diodes D1, D2 and four resistors R3, R4, R5, R6 connected in series between sources of positive and negative potential. The junction of resistors R4 and R5 is connected to the output of an amplifier 113b, and the junction of resistors R3 and R4 is connected to the input side of the amplifier 113b through a diode D1. The junction of resistors R5 and R6 is also connected to the input of the amplifier 113b through a diode D5. Thus the amplitude limiting circuit 113 has the construction of a limiter. The upper limit value is decided by the divided voltage applied to the diode D1 by the serially connected resistors R3 through R6, and the lower limit value is decided by the divided voltage applied to the diode D2 by these same resistors.

Let us now discuss the operation of the apparatus shown in FIG. 2 in a case where the speed command is elevated during rotation of the A.C. motor 101 at a certain speed.

To rotate the motor 101 at a desired speed $V_c$, an addition terminal of the arithmetic circuit 105 is supplied with a speed command voltage VCMD having a predetermined analog value. The motor 101 rotates at an actual speed $V_a$ ($<V_c$) at this time, and the pulse generator 102 and FV converter 104 cooperate to produce the actual speed voltage TSA proportional to the actual motor speed $V_a$, the actual speed voltage TSA being applied to a subtraction terminal of the arithmetic circuit 105. The latter computes a speed error ER which is the difference between the commanded speed $V_c$ and the actual speed $V_a$ and applies the speed error ER to the error amplifier 106, which then performs an arithmetic operation of proportinal integration as expressed by the following equation:

$$ER' = K1(Vc - Va) + K2\Sigma(Vc - Va)$$
$$(Vc - Va) = \Sigma(Vc - Va) + (Vc - Va) \quad (11)$$

The output of the error amplifier 106 is converted to the absolute value by the absolute value circuit 107 and the FV converter 108 generates pulses $P_e$ whose frequency is proportional to the error ER'. Then, the microcomputer 109 generates the current command amplitude (digital value) $I_1$ and the three phase sine wave signals by using the pulse train $P_e$ and pulse train $P_n$ or $P_r$ delivered from the quadrupling circuit 103. The current command amplitude $I_1$ enters the phase current generating circuits 110, 111, 112 in the respective phases U, V, W through the amplitude limiting circuit 113, the phase current generating circuits operating to multiply $I_1$ by each of the sine waves sin, sin $(\theta + (2\pi/3))$ and sin $(\theta + 4\pi/3)$ to produce three-phase command currents $I_u$, $I_v$, $I_w$. The arithmetic circuits 116U, 116V, 116W subsequently compute the differences between the three-phase command currents $I_u$, $I_v$, $I_w$ and the actual phase currents Iau, Iav, Iaw. Three-phase A.C. signals $i_u$, $i_v$, $i_w$ indicative of the computed differences are amplified by the current amplifiers 118U, 118V, 118W and applied to the pulse modulation circuit 119. As described above, the pulse modulation circuit 119 compares the amplitudes of the three-phase A.C. signals $i_u, i_v, i_w$ with the amplitude of the sawtooth signals STS, and applies pulse-width modulated three-phase current commands to the base of the power transistors Q1 through Q6 constituting the inverter 120, thereby controlling the on-off action of these power transistors to supply the motor 101 with three-phase currents. The motor 101 is subsequently controlled in a similar manner until the motor speed finally comes into agreement with the commanded speed.

In concurrence with the foregoing operation, the adding circuit 115 is receiving the three-phase A.C. signals $i_u, i_v, i_w$ from the current amplifiers 118 U, 118V, 118W, the adding amplifier 115a of the adding circuit 115 producing an output signal indicative of $i_u + i_v + i_w$. When the three-phase A.C. signals $i_u$, $i_v$, $i_w$ comprises solely the fundamental harmonic component, $i_u + i_v + i_w$ will be zero, the limit value circuit 114 and amplitude limiting circuit 113 will be inactive, and the current command amplitude $I_1$ will be delivered intact to the phase current generating circuits 110, 111, 112 via the amplifier 113b. If the three-phase A.C. signals $i_u, i_v, i_w$ are distorted into trapezoidal waveforms, on the other hand, then the adding amplifier 115a will develop a positive or negative voltage, depending upon the rotational direction of the A.C. motor 101, and the magnitude of the voltage will be commensurate with the degree of distortion. When the output of the adding amplifier 115a is positive, the output of the current amplifier 114a will go negative and the output of the current amplifier 114b positive. This causes the upper limit value of the diode D1 in the amplitude limiting circuit 113 to decline, so that the positive input voltage to the amplifier 113b is diminished by the amount of negative voltage generated by the current amplifier 114a. When the output of the adding amplifier 115a is negative, on the other hand, the output of the current amplifier 114a will go positive and the output of the current amplifier 114b negative. This causes the upper lower value of the diode D2 in the amplitude limiting circuit 113 to rise, so that the negative input voltage to the amplifier 113b is made less negative by the amount of positive voltage generated by the current amplifier 114a. Thus, the current command amplitude $I_1$ produced by the amplifier 113b is limited to a value below saturation voltage. In consequence, saturation will not arise in subsequent amplification so that the three-phase outputs applied to the A.C. motor 101 will comprise solely the fundamental harmonic component.

Figure 7:
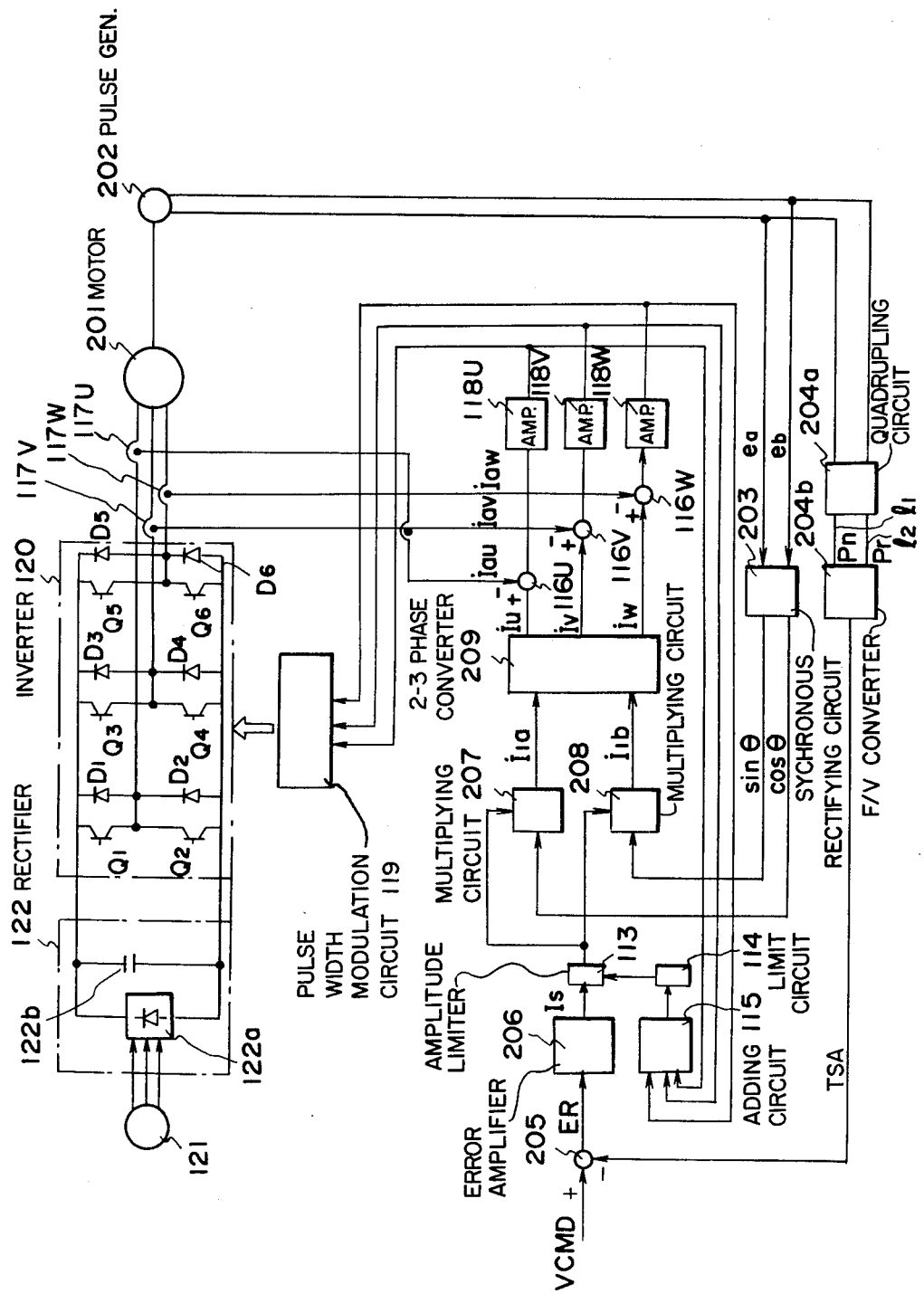
FIG. 7 is a block diagram illustrating an embodiment of a synchronous motor drive apparatus according to the present invention.
Figure 8:
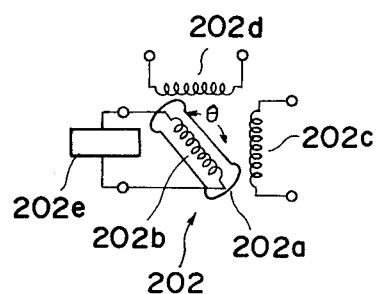
FIG. 8 is a diagram useful in describing a resolver employed in the arrangement in FIG. 8.
Figure 9:
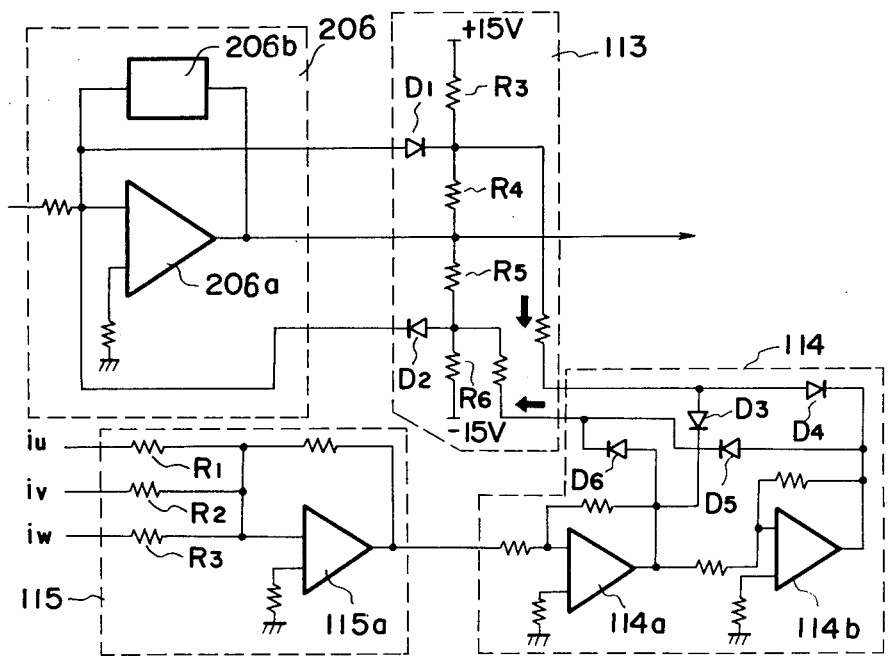
FIG. 9 is a circuit diagram illustrating an error amplifier, amplitude limiting circuit, limit value generating circuit and adding circuit in the apparatus of FIG. 7.

Next, reference will be had to FIG. 7 illustrating a synchronous motor drive apparatus embodying the present invention. In FIG. 7, the same numerals denote the same parts as the parts of FIG. 2. The rotating field type synchronous motor is indicated 201. Connected to the shaft of the motor 201 is a pulse generator such as resolver 202 for sensing the position of the field pole. As shown in FIG. 8, the resolver 202 includes a rotor 202a, a rotorwinding 202b, two stator windings 202c, 202d displaced in phase from each other by 90°, and a carrier wave generating circuit 202e for generating a carrier wave sin wt. If we assume that the rotor 202a occupies a position corresponding to the angle $\theta$, then the stator windings 202c, 202d will produce voltages given by the following:

$$e_a = \sin \cdot \sin wt \quad (12)$$

$$e_b = \cos \cdot \sin wt \quad (13)$$

Thus the resolver 202 produces a sine wave voltage $e_a$ and a cosine wave voltage $e_b$, both of which conform to the position $\theta$ of the field pole of synchronous motor 201.

Returning to FIG. 7, the output sine wave and cosine wave voltages $e_a$, $e_b$ of resolver 202 are applied to a synchronous rectifying circuit 203 which synchronously rectifies these into sine and cosine signals sin $\theta$, cos $\theta$. A quadrupling circuit 204a also receives the sine and cosine wave voltages $e_a$, $e_b$ and is adapted to convert them into pulse trains having four times the frequency of the input sine and cosine signals. The quadrupling circuit 204a, which functions to monitor the phases of the sine and cosine voltage signals $e_a$, $e_b$, delivers a forward pulse train $P_n$ of the quadrupled frequency on line l₁ when the motor is rotating in the forward direction, and a reverse pulse train $P_r$ of the quadrupled frequency on line l₂ when the motor is rotating in the reverse direction. The forward and reverse pulse trains $P_n$, $P_r$ are applied to a frequency-voltage converter (hereinafter referred to as an F/V converter) 204b adapted to convert the pulse frequency into a voltage signals TSA, which represents the actual speed of the synchronous motor 201. An arithmetic circuit 205 receives the actual speed voltage signal TSA as well as speed command voltage VCMD which enters from a speed command circuit, not shown, and is adapted to compute the difference (known as the speed error) ER between TSA and VCMD. The output ER of the arithmetic circuit 205 is applied to an error amplifier 206 for amplifying the speed error ER to produce the amplitude $I_s$ for an armature current. The output $I_s$ of the amplifier 206 is applied to multiplier circuits 207, 208, which receives also the outputs $\cos\theta$, $\sin\theta$, respectively, from the synchronous rectifying circuit 203. Multiplying circuit 207 therefore produces a current command $I_1 \cdot a$ ($=I_s \cdot \cos\theta$), and multiplying circuit 208 a current command $I_1 \cdot b$ ($=I_s \cdot \sin\theta$). Accordingly, the current commands are of two difference phases. The two-phase signals are converted into three-phase signals by a two phase/three phase converting circuit 209.

Let us now discuss the operation of the apparatus shown in FIG. 7 in a case where the speed command is elevated during rotation of the synchronous motor 201 at a certain speed.

To rotate the motor 201 at a desired speed Vc, an addition terminal of the arithmetic circuit 205 is supplied with a speed command voltage VCMD having a predetermined analog value. The motor 201 rotates at an actual speed Va (<Vc) at this time, and the pulse generator 202 and FV converter 204b cooperate to produce the actual speed voltage TSA proportional to the actual motor speed Va, the actual speed voltage TSA being applied to a subtraction terminal of the arithmetic circuit 205. The latter computes a speed error ER which is the difference between the commanded speed Vc and the actual speed Va and applies the speed error ER to the error amplifier 206, which then performs an arithmetic operation of proportional integration as expressed by the following equation:

$$Is = K1(Vc-Va) + K2\Sigma(Vc-Va)$$
$$(Vc-Va) = \Sigma(Vc-Va) + (Vc-Va) \qquad 14$$

The result Is in Eq. (14) is a current command amplitude which corresponds to the amplitude of the armature current. Accordingly, when the load varies or the speed command changes, the speed error ER (=Vc−Va) becomes greater, as does the current command amplitude Is correspondingly. The increased amplitude Is results in the production of a greater torque, which brings the actual rotational speed of the motor into conformity with the commanded speed.

The current command amplitude Is enters the multiplying circuits 207, 208 through the amplitude limiting circuit 113, the multiplying circuits operating to multiply Is by each of the sine waves $\sin\theta$, $\cos\theta$ delivered from the circuit 203 to produce two-phase command currents $I_{1a}$, $I_{1b}$. The arithmetic circuits 116U, 116V, 116W subsequently compute the differences between the three-phase command currents $I_U$, $I_V$, $I_W$ obtained by the two phase/three phase converting circuit 209 and the actual phase currents Iau, Iav, Iaw. Three-phase A.C. signals $i_u$, $i_v$, $i_w$ indicative of the computed differences are amplified by the current amplifiers 118U, 118V, 118W and applied to the pulse modulation circuit 119. As described above, the pulse modulation circuit 119 compares the amplitudes of the three-phase A.C. signals $i_u$, $i_v$, $i_w$ with the amplitude of the sawtooth signal STS, and applies pulse-width modulated three-phase current commands to the bases of the power transistors Q1 through Q6 constituting the inverter 120, thereby controlling the on-off action of these power transistors to supply the motor 201 with three-phase currents. The motor 201 is subsequently controlled in a similar manner until the motor speed finally comes into agreement with the commanded speed.

In concurrence with the foregoing operation, the adding circuit 115 is receiving the three-phase A.C. signals $i_u$, $i_v$, $i_w$ from the current amplifiers 118U, 118V, 118W, the adding amplifier 115a of the adding circuit 115 producing an output signal indicative of $i_u+i_v+i_w$. When the three-phase A.C. signals $i_u$, $i_v$, $i_w$ comprise solely the fundamental harmonic component, $i_u+i_v+i_w$ will be zero, the limit value circuit 114 and amplitude limiting circuit 113 will be inactive, and the output of the error amplifier 206 will be delivered intact to the multiplying circuits 207, 208. If the three-phase A.C. signals iu, iv, iw are distorted into trapezoidal waveforms, on the other hand, then the adding amplifier 115a will develop a positive or negative voltage, depending upon the rotational direction of the A.C. motor 201, and the magnitude of the voltage will be commensurate with the degree of distortion. When the output of the adding amplifier 115a is positive, the output of the current amplifier 114a will go negative and the output of the current amplifier 114b positive. This causes the upper limit value of the diode D1 in the amplitude limiting circuit 113 to decline, so that the positive input voltage to the amplifier 206a is diminished by the amount of negative voltage generated by the current amplifier 114a. When the output of the adding amplifier 115a is negative, on the other hand, the output of the current amplifier 114a will go positive and the output of the current amplifier 114b negative. This causes the upper lower value of the diode D2 in the amplitude limiting circuit 113 to rise, so that the negative input voltage to the amplifier 206a is made less negative by the amount of positive voltage generated by the current amplifier 114a. Thus the current command amplitude Is produced by the amplifier 206a is limited to a value below saturation voltage. In consequence, saturation will not arise in subsequent amplification so that the three-phase outputs applied to the A.C. motor 201 will comprise solely the fundamental harmonic component.

In accordance with the present invention as described and illustrated hereinabove, current commands in each of three phases are generated from a current command amplitude and the A.C. motor is driven based on A.C. signals obtained by taking the difference these three-phase current commands and the phase currents actually applied. According to a feature of the invention, higher harmonic components are detected based on the sum of the resulting difference values, and the amplitude of the current command is limited in accordance with any higher harmonic so detected. Accordingly, a limiting action is applied to prevent current amplifier saturation when the current command amplitude takes on a large value owing to a large error ER. The three-phase current commands will therefore be approximately sinusoidal and free of a higher harmonic component. This makes it possible to avoid any decrease in the effective voltage impressed upon the A.C. motor, whereby a decline in torque may be avoided.

As many apparently widely different embodiments of the present invention can be made without departing from the spirit and scope thereof, it is to be understood that the invention is not limited to the specific embodiments thereof except as defined in the appended claims.

We claim:

1. An apparatus for driving an A.C. motor, comprising:
   (a) a circuit for producing a current command amplitude from an arithmetic difference between an externally applied speed command voltage and an actual speed voltage indicative of the actual rotational speed of the A.C. motor;
   (b) a circuit for generating polyphase command currents based on the current command amplitude;
   (c) a current detecting circuit for detecting polyphase currents actually applied to the A.C. motor;
   (d) an arithmetic circuit for producing output signals indicative of difference currents between the polyphase command currents and corresponding ones of the phase currents detected by said current detecting circuit;
   (e) a current amplifier which amplifies the outputs of said arithmetic circuit for producing polyphase A.C. signals;
   (f) a pulse-width modulation circuit driven by the polyphase A.C. signals from said current amplifier;
   (g) an inverter controlled by said pulse-width modulation circuit for driving the A.C. motor; and
   (h) means for computing the sum of the polyphase A.C. signals and for limiting the current command amplitude when said sum is other than zero;
   the current command amplitude being limited in accordance with any imbalance in the polyphase A.C. signals to maintain the polyphase currents actually applied to the A.C. motor in a balanced state.

2. The apparatus according to claim 1, in which said means (h) comprises an adding circuit, a limit value generating circuit and an amplitude limiting circuit.

* * * * *

UNITED STATES PATENT AND TRADEMARK OFFICE
CERTIFICATE OF CORRECTION

PATENT NO. : 4,458,192                    Page 1 of 3
DATED      : July 3, 1984
INVENTOR(S): Keiji Sakamoto et al It is certified that error appears in the above-identified patent and that said Letters Patent is hereby corrected as shown below:

Front page, after "[22] Filed: Dec. 11, 1981", the following should be inserted
--Foreign Application Priority Data
March 12, 1982 [JP] Japan ..............57-39096--.

Column 1, line 52, "$\phi_2$" should be --$\dot{\phi}_2$--;

line 53, "$I_2$" should be --$\dot{I}_2$--;

line 58, "$\phi_2$" should be --$\dot{\phi}_2$--;

"$I_2$" should be --"$\dot{I}_2$--.

Column 2, line 1, "$I_1$" should be --$\dot{I}_2$--;

line 2, "$I_0$" should be --$\dot{I}_0$--;

line 3, "$I_1$" should be --$\dot{I}_1$--;

line 8, "$\Phi(\Phi$" should be --$\psi(\psi$--;

line 9, "$\omega$" should be --$\underline{\omega}$--;

UNITED STATES PATENT AND TRADEMARK OFFICE
CERTIFICATE OF CORRECTION

PATENT NO. : 4,458,192
DATED : July 3, 1984
INVENTOR(S) : Keiji Sakamoto et al

It is certified that error appears in the above-identified patent and that said Letters Patent is hereby corrected as shown below:

line 12, "$\Phi$" should be --$\psi$--, first occurrence;

"$\Phi$" should be --$\psi$--, second occurrence;

line 13, "$\Phi$" should be --$\psi$--, first occurrence;

"$\Phi$" should be --$\psi$--, second occurrence;

line 64, "b" should be --$\underline{b}$--, first occurrence;

"b" should be --$\underline{b}$--, second occurrence.

Column 3, line 3, "b" should be --$\underline{b}$--;

line 30, "comand" should be --command--;

UNITED STATES PATENT AND TRADEMARK OFFICE
CERTIFICATE OF CORRECTION

PATENT NO. : 4,458,192

DATED : July 3, 1984

INVENTOR(S) : Keiji Sakamoto et al

It is certified that error appears in the above-identified patent and that said Letters Patent is hereby corrected as shown below:

line 66, "embodyment" should be --embodiment--.

Column 4, line 35, "$1_1$" should be --$\ell_1$--;

line 37, "$1_2$" should be --$\ell_2$--.

Column 5, line 31, "commands" should be --command--.

Column 7, line 18, "poroportinal" should be --proportional--.

Column 8, line 62, "$1_1$" should be --$\ell_1$--;

line 64, "$1_2$" should be --$\ell_2$--.

Signed and Sealed this

Twentieth Day of November 1984

[SEAL]

Attest:

GERALD J. MOSSINGHOFF

Attesting Officer      Commissioner of Patents and Trademarks